VEHICULAR TRANSISTOR RADIO RECEIVER

Filed Oct. 4, 1961 2 Sheets-Sheet 1

MICHAEL SLAVIN
CARLOS A.B. CARVALHO
INVENTORS

BY

Kellman, Smith & Lamb
ATTORNEYS

MICHAEL SLAVIN
CARLOS A.B. CARVALHO
INVENTORS

BY

Killman, Smith & Lamb
ATTORNEYS

United States Patent Office 3,119,966

Patented Jan. 28, 1964

3,119,966

VEHICULAR TRANSISTOR RADIO RECEIVER

Michael Slavin and Carlos A. B. Carvalho, Towson, Md., assignors to The Bendix Corporation, Towson, Md., a corporation of Delaware Filed Oct. 4, 1961, Ser. No. 142,946
9 Claims. (Cl. 325—319)

This invention relates to radio receivers and more particularly to a transistorized receiver having substantial advantages as to cost and reduced size when used in association with a direct current power supply having a substantial undesired alternating current component such as that found on automobiles.

The typical power source for a present day automobile radio is a 12 volt battery, but its output is usually modified by a considerable A.C. component in the form of ignition noise which is present over a wide frequency range. Consequently, filtering becomes a very significant factor in automobile radios and filtering components often contribute substantially to the size and cost of such radios. Another problem which is unusually severe in automobile radios is that of providing a really effective and satisfactory automatic gain control inasmuch as input voltages may vary over a range such as from 10 microvolts to one volt or more.

It is therefore an object of the present invention to provide a radio receiver suitable for use in an automobile in which an unsually effective and economical automatic gain control system is provided.

It is another object of the present invention to provide a radio receiver suitable for use in an automobile or with a variable power supply of the type described above in which unusually effective filtering is accomplished with a minimum of filtering components.

It is another object of the present invention to provide a radio receiver accomplishing the above objects which can be manufactured in a comparatively small and light package.

It is a further object of the present invention to provide a radio receiver accomplishing the above objects and which is easily and economically fabricated.

Other objects and advantages will become apparent from the following specification taken in connection with the accompanying drawings in which.

Figure 1:
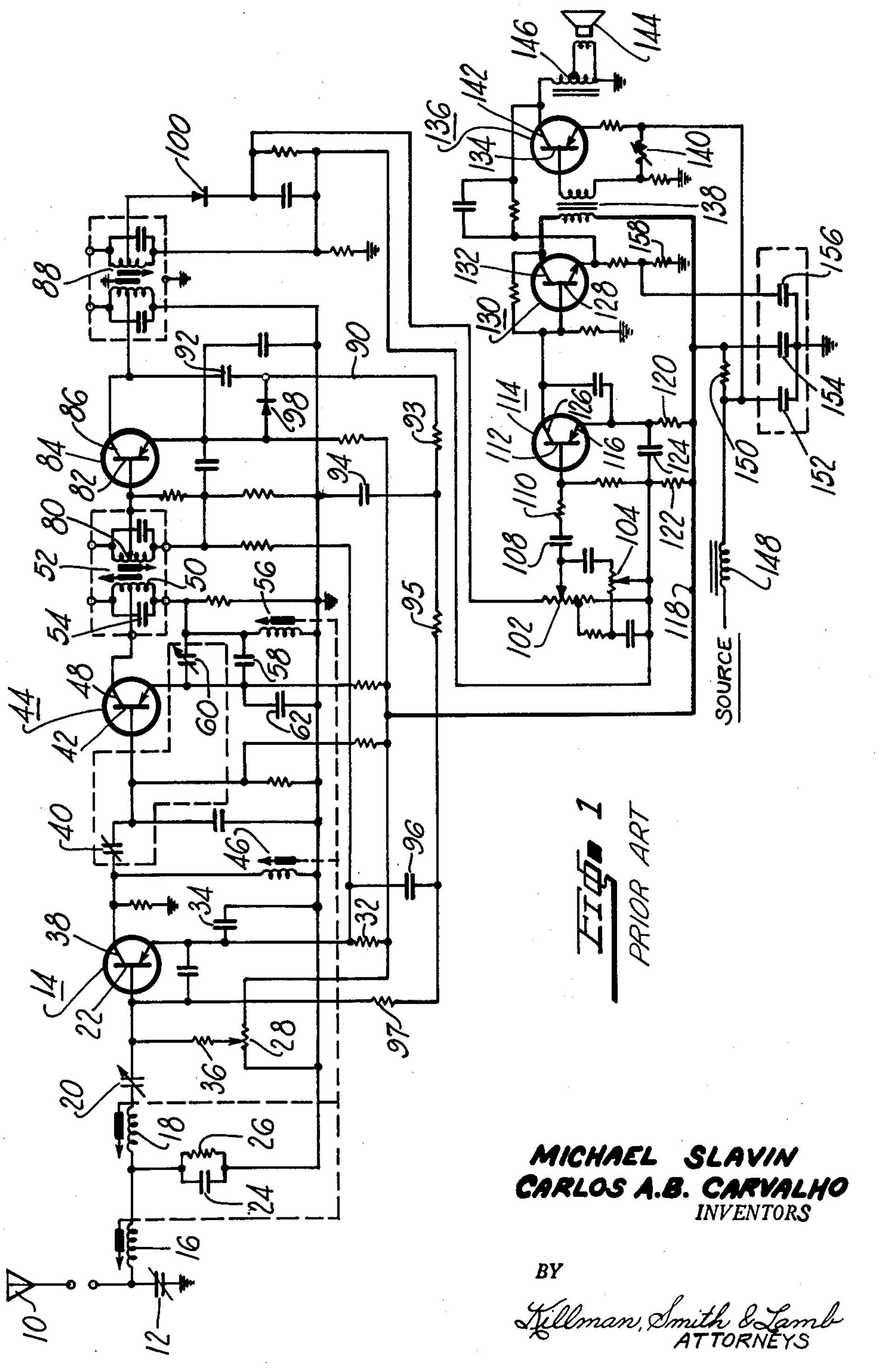
FIG. 1 PRIOR ART
FIG. 1 is a schematic diagram of a typical prior art radio.

The receiver shown in FIG. 1 is typical of a present day production design and constitutes a very satisfactory radio although it is somewhat expensive to produce. The antenna 10 is connected through a variable capacitor 12 to ground. The input to the first transistor 14 is a conventional antenna pi circuit using a pair of tuned inductors 16 and 18 and a variable capacitor 20 in the input to the base 22. Connected to the junction between inductors 16 and 18 is a coupling means consisting of a capacitor 24 and a resistor 26 having their opposite terminals grounded. Capacitors 12 and 24 in conjunction with inductors 16 and 18 constitute a double-tuned antenna circuit which provides good rejection of undesirable signals of both high and low frequency. A current setting potentiometer 28 is effectively connected between the base 22 of the radio frequency transistor 14 and ground, and its function is to provide the desired collector current levels in the receiver by providing means for varying the voltage across an emitter resistor 32. The emitter resistor 32 is bypassed with a capacitor 34. A resistor 36 of fairly high value is connected between the slider of potentiometer 28 and the base 22.

The collector 38 of transistor 14 is connected through a coupling capacitor 40 to the base 42 of a transistor 44. Connected in the circuit of collector 38 is a variable inductor 46 which serves to tune the circuit of collector 38 and hence the radio frequency stage of the receiver. The collector 48 of the converter transistor 44 is connected to the primary winding 50 of an intermediate frequency transformer 52. Connected in parallel with winding 50 is a capacitor 54. A terminal common to one side of coil 50 and capacitor 54 is connected to a resonant circuit including variable inductor 56 and capacitors 58 and 60. A capacitor 62 provides a tap controlling the amount of A.C. feedback to the emitter for sustaining oscillation action. It will be observed that the tunable elements of variable inductors 16, 18, 46 and 56 are mechanically linked together for simultaneous operation.

The modulated intermediate frequency signal is supplied from the secondary winding 80 of the intermediate frequency transformer 52 to the base 82 of an intermediate frequency amplifier transistor 84, where it is further amplified. The collector 86 of transistor 84 is connected to a second intermediate frequency transformer 88. The automatic gain control line 90 is connected through a capacitor 92 from collector 86 to the base 22 of transistor 14. Most of the intermediate frequency component is filtered by means of resistor 93 and capacitor 94. Further filtering of audio and intermediate frequencies is provided by resistor 95 and capacitor 96. A resistor 97 isolates the input to the base 22 from capacitor 96. A diode 98 provides rectification of the signal appearing at collector 86. The signal on the secondary winding of intermediate frequency transformer 88 is fed to a diode 100 where it is detected. It is then supplied to a resistance network including a volume control potentiometer 102 and a tone control potentiometer 104, whence it is connected through a coupling capacitor 108 and a resistor 110 to the base 112 of an audio amplifier transistor 114. The emitter 116 of this transistor is connected to the filtered power line 118 through a resistor 120. The circuit of base 112 is effectively decoupled from the emitter signal voltage by means of a base resistor 122 and the "bootstrap" capacitor 124. The collector 126 of transistor 114 is directly coupled to the base 128 of an NPN transistor 130. The collector 132 of transistor 130 is coupled to the base 134 of output transistor 136 through an interstage transformer 138. A current setting potentiometer 140 is connected in the base emitter circuit of transistor 136 as a means for controlling the output current at the collector 142. The speaker 144 is inductively coupled to collector 142 through a choke coil 146.

Power is supplied from a source, not shown, through a coil 148 and a resistor 150 to the filtered power line 118. A capacitor 152 bypasses high frequencies passing through coil 148. Further filtering is provided by the capacitor 154. The third capacitor 156 in this three-section electrolytic unit acts as a bypass for an emitter resistor 158.

Figure 2:
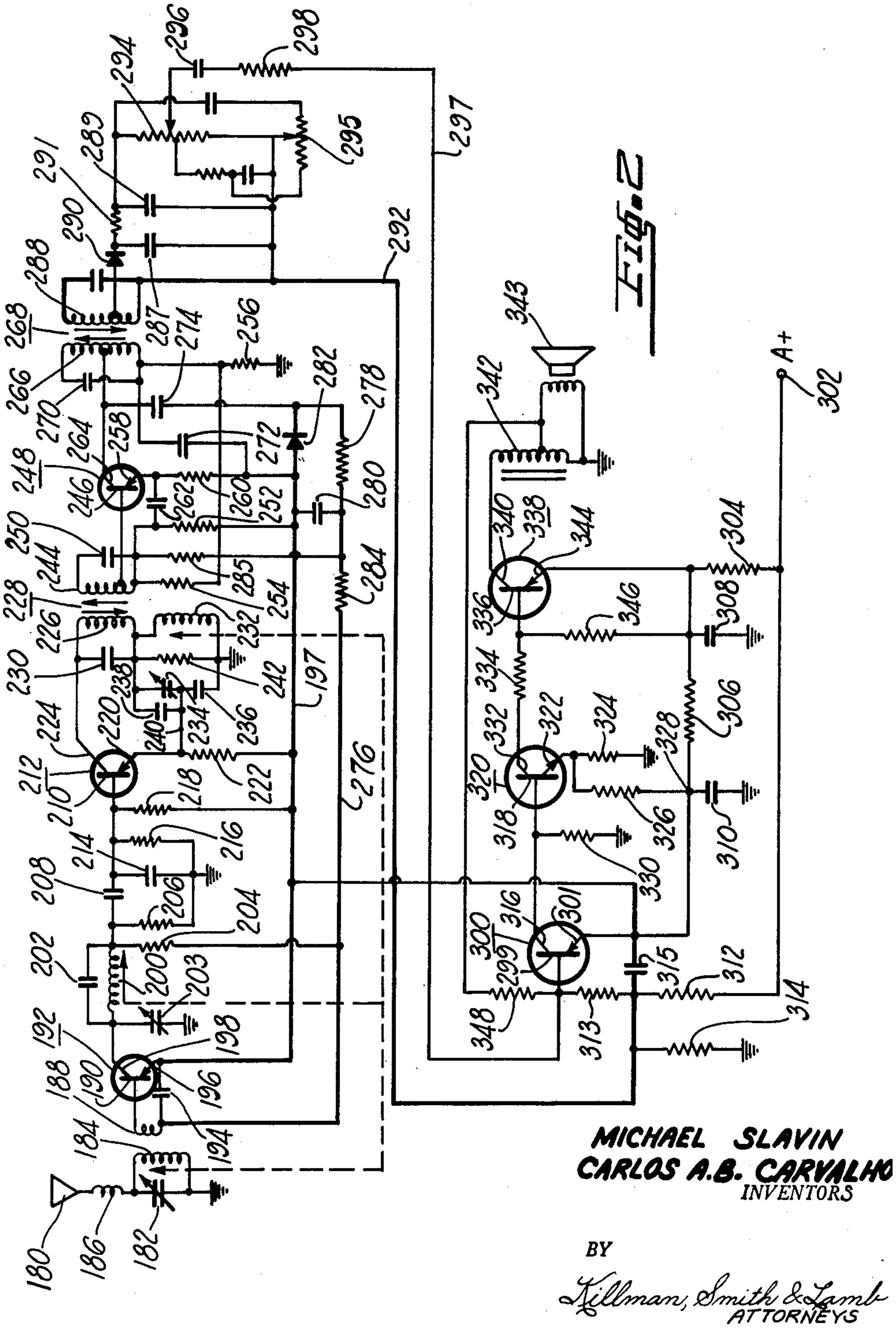
FIG. 2 is a schematic diagram of a radio receiver incorporating our invention.

FIG. 2 is a schematic diagram of a radio receiver incorporating our invention. The signal is received at an antenna 180 connected in a parallel antenna circuit consisting of a variable capacitor 182 with a tunable primary coil 184 connected thereacross. A small antenna coil 186 is connected in series with the antenna 180 to attenuate undesirable high frequencies such as ignition noise. The secondary winding 188 is connected at one side to the base 190 of transistor 192 and at the other side through a capacitor 194 to the emitter 196. Emitter 196 is connected directly to the filtered power line 197. The collector 198 is connected to a tuned trapped pi current including a variable inductor 200 and capacitors 202, 203, 208 and 214. A resistor 204 connected between coil 188 and a terminal common to inductor 200 and capacitor 202 provides a means for biasing base 190. Also effectively connected to this common point is the collector D.C. load resistor 206. Capacitors 208 and 214 provide a capacitive tap passing the radio frequency signal to the base 210 of a converter transistor 212. Capacitor 214 also serves as a bypass capacitor for passing undesirable high frequency signals to ground. Resistors 216 and 218 provide means for biasing base 210 and the emitter 220 is biased by means of the bias resistor 222. The collector 224 of transistor 212 is connected to the primary winding 226 of an intermediate frequency transformer 228. A capacitor 230 is connected across winding 226. Also connected to winding 226 is a variable inductor 232 which cooperates with capacitors 234, 236 and 238 to form a resonant circuit. These capacitors are connected to provide a capacitive tap on this resonant circuit which is connected to the emitter 220 through a wire 240 providing the amount of feedback to the transistor 212 necessary to sustain oscillations. A resistor 242 operates to limit the amplitude of the oscillator output, particularly at the lower frequencies. This avoids overdriving of the oscillator with its resultant generation of spurious harmonic frequencies and distortion. The secondary winding 244 of transformer 228 is connected from a tap directly to the base 246 of a transistor 248. A capacitor 250 is connected across winding 244. Connected to a terminal common to winding 244 and capacitor 250 are a final base bias resistor 252 connected to power line 197 and a second bias resistor 254 which is connected to ground through an additional resistor 256. The emitter 258 of transistor 248 is connected to the power line 197 through a resistor 260. A capacitor 262 provides a "bootstrap" coupling from the base circuit to the emitter 258 to prevent degenerative feedback of the signal appearing across resistor 260.

The output from the collector 264 of transistor 248 is applied to the primary winding 266 of an intermediate frequency transformer 268. A capacitor 270 is connected across winding 266 and the resistor 256 is connected between one end of said winding and ground. This resistor, in addition to serving as part of the network for biasing the base 246, also provides a tap for feeding part of the D.C. signal from collector 264 back to base 246 for stability. A capacitor 272 provides a standard bypass function from the primary winding 266 to the power line 197.

A diode 282 is connected between the power line 197 and the collector tap of the intermediate frequency transformer 268 by way of a coupling capacitor 274 so that it serves as a peak rectifier for the signal appearing at collector 264 and stores the peak value of the signal as a charge on the capacitor 274. The signal across diode 282 is filtered by means of a resistor 278 and a capacitor 280 and a part of this A.G.C. signal is connected through a resistor 285 to the base circuit of transistor 248. Further filtering is provided by a resistor 284 and capacitor 194 before the signal appears in the base circuit of the radio frequency transistor 192.

The secondary winding 288 of transformer 268 is connected to a diode 290 which constitutes the detector for the receiver. The signal passing diode 290 which includes some intermediate frequency harmonics is bypassed by means of a network consisting of capacitors 287 and 289 and resistor 291 to the line 292 before being impressed across a volume and tone control network which is conventional and which includes a volume control potentiometer 294 and a tone control potentiometer 295. The signal appearing at the slider of potentiometer 294 is connected through a coupling capacitor 296 and a resistor 298 in line 297 to the base 299 of transistor 300. Therefore, any ripple appearing subsequent to diode 290 on line 297 and impressed on base 299 also appears on line 292 in the circuit of emitter 301 and is ineffectual as an input.

Emitter 301 is connected to the power source at terminal 302 through resistors 304 and 306. When the amplifier is used in an automobile radio, the power source, which is typically about 12 volts D.C. inevitably contains a substantial alternating current component as a result of the operation of the ignition system. Typically, it has been necessary to install a comparatively large and heavy choke coil in the power line in order to attenuate these alternating currents. In the present amplifier it has been found possible to provide adequate power supply filtering to the emitter 301 of transistor 300 and preceding stages by means of resistors 304 and 306 in combination with bypass capacitors 308 and 310. Resistor 304 having a positive temperature coefficient, is a self-heating type and its effect will be described in detail below. A resistor 312, also effectively connected to the power terminal 302, acts in conjunction with resistors 313 and 314 to establish the bias on transistor 300. This is unfiltered power supply current connected to resistor 312 and, in order to remove noise or "purr" from the system, a capacitor 315 is connected between resistor 312 and the emitter 301. Capacitor 315 also prevents audio frequencies from subsequent stages from circulating in the base emitter circuit of transistor 300.

The collector 316 of transistor 300 is connected to the base 318 of an NPN transistor 320. The emitter 322 of this transistor is connected to ground through a resistor 324. A resistor 326 is effectively connected between the filtered power terminal 328 and emitter 322 to provide the desired voltage level at the emitter 322. A resistor 330, connected between base 318 and ground, contributes to establishing the bias on this stage.

The collector 332 of transistor 320 is connected through a current limiting resistor 334 to the base 336 of a PNP transistor 338, which is the output transistor of the amplifier. The collector 340 supplies the output of the amplifier to an inductive load consisting of a coil 342 connected between collector 60 and ground, which drives the speaker 343. The emitter 344 of transistor 338 is connected directly to the special resistor 304. A resistor 346, which is typically a thermistor, operates to establish the bias on base 336 and tends to stabilize the direct current flow in the system with temperature.

Overall negative feedback is provided by means of a resistor 348 connected to feed a portion of the output appearing in the coil 342 back to the base 299 of transistor 300.

With the circuit as described, the output current is established by means of the voltage drop across resistor 304 which has a positive temperature coefficient and normally operates at temperatures well above ambient, and the values of resistors 312 and 314. A change in output current produces a change in the voltage drop across resistor 304, which change is substantially compensated for by the large direct current gain in the feedback loop. Additional direct current gain is realized in the circuit by making resistor 304 a self-heating resistor such that anything which would tend to cause excessive currents to be drawn through resistor 304 will cause its temperature to increase, thus increasing its resistance and, hence, increasing the error voltage across it. Resistor 304 and capacitor 308 and resistor 306 and capacitor 310 constitute filter sections providing attenuation to audio signals appearing at emitter 344, thus eliminating undesired A.C. feedback along the D.C. feedback path.

From a comparison of the circuits of FIGS. 1 and 2 it will be apparent that the device of FIG. 1 is appreciably more complex and requires more components than does the FIG. 2 device. The receiver shown in FIG. 1 has a double tuned antenna circuit which requires an additional tuning inductor. In the radio frequency stage, the D.C. bias on the transistor 14 is obtained by means of resistors 32, 36, 93, 95, 97 and by diode 98. Because of the use of the conventional emitter resistor 32, the bypass capacitor 34 is required to keep the gain of the stage at the desired value. In the FIG. 2 receiver the D.C. bias on transistor 192 is established by resistors 200, 206, 278 and 284 and by diode 282. The D.C. operating point is stabilized by connecting the base bias resistor 204 to the D.C. collector load resistor 206 and the emitter 196 is connected directly to the power line 197. This eliminates the emitter resistor 32 and the by-pass capacitor 34 (see FIG. 1). In the receiver of FIG. 1 the D.C. bias potentiometer 28 is required to set D.C. current levels at collector 38 and to provide means for compensating for different values of beta of different transistors. Such a potentiometer, which has an element of unreliability and which takes up considerable space, is not required in the FIG. 2 receiver.

It is well known that even very small spurious signals appearing in the base-emitter circuit of the radio frequency stage will cause unsatisfactory operation in the form of rumbles, tweets, and whistles. These signals are most often derived as harmonics from the output of the intermediate frequency stage together with its rectifier either through the power line or through the automatic gain control line. Typically, the intermediate frequency ripple is by-passed to ground where it flows through the chassis and appears across the electrolytic capacitors in the power section. During the course of aging of the electrolytic capacitors this by-passing function may become impaired thereby permitting some of the ripple to find its way back to the radio frequency stage through the power line. Whenever a circuit is designed with significant currents flowing in the chassis, reproducibility problems begin to appear because the exact path through the chassis may become indeterminate and vary from chassis to chassis. In the FIG. 2 radio, because of the presence of resistor 256 and capacitor 272, most of the intermediate frequency ripple appears across resistor 256 and is contained in the intermediate stage. Because of the arrangement of the base-emitter circuit of the radio frequency transistor 192 including the input from secondary coil 188, the lines 197 and 276 are effectively tied together, but neither is tied to ground so that ripple appearing on one of these lines tends to be compensated for by the ripple on the other. The emitter 190 and the base 196 being directly tied to lines 197 and 276 respectively, no ripple potential is developed between them and therefore any ripple potential between these lines and ground has no effect on the radio frequency stage. To insure this isolation, the stray capacity between the base side of winding 188 and ground should be minimized in the input transformer design.

In addition to the desirable saving of parts referred to above, this design provides the advantage that the voltage level of the automatic gain control signal required to accomplish a desired amount of control is considerably less than when the emitter resistor is used. Less power is drawn from the circuit of collector 264 and therefore the overall gain is higher. In any receiver it is well known that the demands of the automatic gain control circuit normally reach a maximum just at the time when the intermediate frequency circuit is least able to supply the power, but this has only become a significant problem with the advent of transistor powered receivers having very limited power. Thus a very considerable advantage is realized in applicants' circuit where the overall power demands of the automatic gain control system are substantially reduced.

A further advantage afforded by the present design is that by having the emitter 196 connected directly to the power line 197 capacitors 194 and 315 share a common terminal thus making it possible to incorporate them in a single electrolytic container as opposed to providing two separate single section electrolytic units such as those at numerals 96 and 124.

While only one embodiment has been shown and described herein, modification may be made without departing from the spirit and scope of the invention.

We claim:

1. In a radio receiver suitable for use in an automobile, a parallel tuned antenna circuit, including primary and secondary windings and a radio frequency amplifier transistor, means connecting said secondary winding to the base of said transistor, a source of direct current power and filtering means for removing undesirable alternating current components from said direct current, means connecting the emitter of said transistor directly to said filtered direct current power, a capacitor connected between said emitter and said secondary winding, tuned circuit means connected in the collector circuit of said transistor, a resistor connected between said collector circuit and said base for providing a bias voltage to said base, a converter transistor having its base connected to said collector circuit, an intermediate frequency amplification stage including a third transistor and an intermediate frequency transformer, an automatic gain control circuit connected between the collector of said third transistor and the bases of said first and third named transistors including an automatic gain control capacitor connected to said last named collector, a diode connected between the opposite side of said automatic gain control capacitor and said filtered direct current power source, a capacitor connected between the primary winding of said intermediate frequency transformer and said power source, a resistor connected between said primary winding and ground, a resistor connected to a point common to said automatic gain control capacitor and said diode, and filtering means connected between said circuit and said power source between said last named resistor and the base of said first named transistor, a detector stage connected to said transformer including a diode, volume control means connected to receive the output of said detector, amplification means connected to said volume control means including a plurality of direct coupled transistors of alternating polarity types, means connecting the emitter of the first of said amplifier transistors to said filtered direct current power source, a capacitor connected between said emitter and the base of said first amplifier transistor such that it shares a common terminal with said first-named capacitor, and sound transducer means connected to the output of said amplification means.

2. In a radio receiver suitable for use in an automobile including a speaker, amplification means for driving said speaker including a plurality of direct coupled amplifier stages, a detector and volume control means connected to said amplification means, an intermediate frequency amplification stage connected to said detector including a transistor, a converter connected to said intermediate frequency amplification stage, a radio frequency amplification stage including a transistor, a tuned antenna circuit including a secondary coil connected to the base of said radio frequency stage transistor and a source of filtered direct current power connected to said transistors, characterized in that the emitter of said radio frequency amplification stage is connected directly to said power source, the bias for the base of said radio frequency transistor is established by means of a resistor connected between the collector circuit of said transistor and its base circuit, and an automatic gain control line is connected between the load circuit of said intermediate frequency transistor and the base of said radio frequency stage transistor, said connection including coupling means, a diode connected between said power source and said line, and filtering means connected between said automatic gain control line and said power source.

3. In a radio receiver for use with a source of direct current power having a substantial undesired alternating current component, a sound transducer, amplification means for driving said sound transducer including a plurality of transistor amplifier stages, a detector stage and volume control means connected to said amplification means, means for filtering said direct current power, an intermediate frequency amplification stage connected to said detector stage including a transistor, a converter stage connected to said intermediate frequency amplification stage, a radio frequency stage connected to said converter stage including a transistor, and antenna means connected to said radio frequency transistor, characterized in that the emitter of said radio frequency transistor is connected directly to said filtered direct current power source, the bias for the base of said radio frequency transistor is established at least in part by means of a resistor connected between the collector circuit of said transistor and its base, and an automatic gain control line including a coupling capacitor, rectifying means, and filtering means connected between said line and said source is connected between the output of said intermediate frequency transistor and the base of said radio frequency transistor.

4. A radio receiver as set forth in claim 3 wherein the first one of said transistor amplifier stages has its emitter connected to said source, and a capacitor is connected between base and emitter of said radio frequency transistor, whereby said capacitors may be made in a single two-section electrolytic container.

5. In a radio receiver for use with a source of direct current power having a substantial undesired alternating current component and for supplying an audio frequency signal to a sound transducer; amplification means for driving said sound transducer including means for filtering said direct current power and a filtered direct current power line; a detector stage and volume control means connected to said amplification means; an intermediate frequency amplification stage including a transistor and first and second intermediate frequency transformers connected to the base and collector of said transistor, respectively; a converter stage connected to said intermediate frequency amplification stage; a radio frequency stage connected to said converter stage including a transistor; and antenna means connected to said radio frequency transistor; the improvement comprising that: said antenna means includes a parallel tuned antenna circuit with a secondary coil having one end connected to the base of said radio frequency transistor; the emitter of said radio frequency transistor is connected directly to said filtered direct current power line; a capacitor is connected between the emitter of said radio frequency transistor and the other end of said secondary coil; a resistor is connected between a terminal on one side of the primary winding of said second intermediate frequency transformer and ground, and a capacitor is connected between said terminal and said power line; a resistor is connected between the secondary winding of said first intermediate frequency transformer and said one side of the primary winding of said second intermediate frequency transformer; and an automatic gain control line is connected between the collector of said intermediate frequency transistor and the base of said radio frequency transistor, said connection including a coupling capacitor connected to the collector of said intermediate frequency transistor, a rectifier connected between the opposite side of said coupling capacitor and said power line, and filtering means connected between said automatic gain control line and said filtered direct current power line.

6. In a radio receiver for use with a source of direct current power having a substantial undesired alternating current component and for supplying an audio frequency signal to a sound transducer; amplification means for driving said sound transducer including means for filtering said direct current power and a filtered direct current power line; a detector stage and volume control means connected to said amplification means; an intermediate frequency amplification stage including a transistor; a converter stage connected to said intermediate frequency amplification stage; a radio frequency stage connected to said converter stage including a transistor; and antenna means connected to said radio frequency transistor; the improvement comprising that: said antenna means includes a tuned antenna circuit with a secondary coil having one end connected to the base of said radio frequency transistor; the emitter of said radio frequency transistor is connected directly to said filtered direct current power line; a capacitor is connected between the emitter of said radio frequency transistor and the other end of said secondary coil; and an automatic gain control line is connected between the load circuit of said intermediate frequency transistor and the base of said radio frequency transistor, said connection including a coupling capacitor connected to the collector of said intermediate frequency transistor, a rectifier connected between the opposite side of said coupling capacitor and said power line, and filtering means connected between said automatic gain control line and said filtered direct current power line.

7. In a radio receiver for use with a source of direct current power having a substantial undesired alternating current component and for supplying an audio frequency signal to a sound transducer; amplification means for driving said sound transducer including means for filtering said direct current power and a filtered direct current power line; a detector stage and volume control means connected to said amplification means; an intermediate frequency amplification stage including a transistor and a transformer connected to the collector of said transistor; a converter stage connected to said intermediate frequency amplification stage; a radio frequency stage connected to said converter stage including a transistor; and antenna means connected to said radio frequency transistor; the improvement comprising that: the emitter of said radio frequency transistor is connected directly to said filtered power line; an automatic gain control line is connected between said intermediate frequency amplification stage and said radio frequency amplification stage, said connection including a coupling capacitor, a rectifier connected between said power line and said automatic gain control line, and capacitive filtering means connected between said automatic gain control line and said power line; and said means connecting said antenna means to said radio frequency transistor including transformer means coupling the antenna signal in series with the connection from said automatic gain control line.

8. In a radio receiver for use with a source of direct current power having a substantial undesired alternating current component and for supplying an audio frequency signal to a sound transducer; a chassis; means for driving said sound transducer including means for filtering said direct current power and a filtered direct current power line; a detector stage and volume control means connected to said amplification means; an intermediate frequency amplification stage including a transistor; a converter stage connected to said intermediate frequency amplification stage; a radio frequency stage connected to said converter stage including a transistor; and antenna means connected to said radio frequency transistor; the improvement comprising that: the emitter of said radio frequency transistor is connected directly to said filtered power line; an automatic gain control line is connected between said intermediate frequency amplification stage and the base of said radio frequency transistor stage, said connection including a coupling capacitor, a rectifier connected between said power line and said automatic gain control line, and capacitive filtering means connected between said automatic gain control line and said power line; and said antenna means including means for coupling the antenna signal to the base of said radio frequency transistor by means substantially isolated from said chassis at signal frequencies.

9. In a radio receiver for use with a source of direct current power having a substantial undesired alternating current component and for supplying an audio frequency signal to a sound transducer; a chassis; amplification means for driving said sound transducer including means for filtering said direct current power and a filtered direct current power line; a detector stage and volume control means connected to said amplification means; an intermediate frequency amplification stage including a transistor; a converter stage connected to said intermediate frequency amplification stage; a radio frequency stage connected to said converter stage including a transistor; and antenna means connected to said radio frequency transistor; the improvement comprising that: the emitter of said radio frequency transistor is connected directly to said filtered power line; an automatic gain control line is connected between said intermediate frequency amplification stage and said radio frequency amplification stage, said connection including a coupling capacitor, a rectifier connected between said power line and said automatic gain control line, and capacitive filtering means connected between said automatic gain control line and said power line; and said antenna means including means for coupling the antenna signal in series with the connection of said automatic gain control line to said radio frequency transistor by means substantially isolated from said chassis.

References Cited in the file of this patent

UNITED STATES PATENTS

| | | |
|---|---|---|
| 2,945,121 | Brodmiller | July 12, 1960 |
| 3,015,726 | De Metrick | Jan. 2, 1962 |

OTHER REFERENCES

Santilli et al.: "Transistorizing Automobile Broadcast Receivers," Electronics, Sept. 18, 1959.